United States Patent [19]
D'Angelo

[11] Patent Number: 5,955,662
[45] Date of Patent: Sep. 21, 1999

[54] DYNAMOMETER AND CALIBRATION TECHNIQUE THEREOF

[75] Inventor: Severino D'Angelo, Laguna Beach, Calif.

[73] Assignee: Snap-on Technologies, Inc., Lincolnshire, Ill.

[21] Appl. No.: 08/812,413

[22] Filed: Mar. 6, 1997

[51] Int. Cl.⁶ .................................................. G01L 3/26
[52] U.S. Cl. ........................................................... 73/117
[58] Field of Search .................. 73/1.08, 1.14, 73/117, 862.09, 862.11, 862.12, 862.13

[56] References Cited

U.S. PATENT DOCUMENTS

| | | | |
|---|---|---|---|
| 2,583,201 | 1/1952 | Bennett | 73/117 |
| 2,781,659 | 2/1957 | Parker, Jr. et al. | 73/117 |
| 2,803,132 | 8/1957 | Clayton | 73/117 |
| 3,277,703 | 10/1966 | Cline | 73/117 |
| 3,365,940 | 1/1968 | MacMillan | 73/117 |
| 3,411,346 | 11/1968 | Gagliardi | 73/117 |
| 3,443,427 | 5/1969 | Cline | 73/117 |
| 3,458,013 | 7/1969 | Haynes | 73/117 |
| 3,803,909 | 4/1974 | Ostrander | 73/117 |
| 4,901,560 | 2/1990 | Hirano et al. | 73/117 |
| 5,000,038 | 3/1991 | Katt | |
| 5,402,674 | 4/1995 | Ganzhorn, Jr. et al. | |
| 5,465,612 | 11/1995 | LaBelle | |
| 5,522,257 | 6/1996 | D'Angelo et al. | 73/117 |

Primary Examiner—Elizabeth L. Dougherty
Attorney, Agent, or Firm—Emrich & Dithmar

[57] ABSTRACT

A dynamometer includes a pair of vehicle wheel-engaging rolls coupled through a clutch to a passive power absorption unit which includes a flywheel and an eddy current brake. A lift between the rolls can raise the vehicle wheels out of engagement with the rolls without braking the rolls The lift cooperates with a frame for partially covering and protecting the access one of the vehicle rolls so that, when the lift is raised the vehicle can be driven off the dynamometer substantially without contact of the vehicle wheels with the access roll. The dynamometer is calibrated by using the vehicle wheels to accelerate and decelerate the rolls, with deceleration activating the clutch to decouple the flywheel, which is then used for a coast-down test.

19 Claims, 7 Drawing Sheets

FIG. 7

DYNAMOMETER AND CALIBRATION TECHNIQUE THEREOF

BACKGROUND OF THE INVENTION

1. Field of the Invention

The present invention relates to dynamometers for simulating the inertia and road load forces encountered by motor vehicles under anticipated driving conditions and, more particularly, to dynamometers of the type which utilize passive power absorption units, i.e., those which do not include motors coupled to the rotating parts.

2. Description of the Prior Art

Vehicle dynamometers are primarily used for two purposes: as measuring devices for determining the torgue and/or horsepower output of the vehicle, and as simulation devices for simulating the forces to which a vehicle is normally subjected during actual operation of the vehicle. The present invention is concerned principally with the latter application. The forces simulated include inertial forces, which are a function of the vehicle's weight and which must be overcome for the vehicle to accelerate or decelerate, and "road load" forces, which are those which must be overcome to maintain vehicle speed, and include such factors as break-away torgue, rolling friction and windage.

Dynamometers typically include a roll (or a pair of rolls) for engaging the driven wheel (e.g., motorcycle) or wheels (e.g., automobile) of the vehicle being tested. The roll or rolls are supported by a shaft or shafts journaled in bearings mounted on a frame.

Typically, a power absorber, such as a friction brake, an eddy current brake or hydrokinetic brake is coupled to the roll for absorbing power to the roll which, in turn, applies a retarding force to the surface of the vehicle wheel to simulate the road load forces. Inertial forces can also be simulated by such power absorbers during acceleration, but not during deceleration, since such absorbers do not supply power. Generally, where such power absorbers are used, the inertial forces are simulated by coupling the roll to one or more mechanical flywheels. The combined inertia of the flywheels and the roll (as well as the absorber) exert force on the vehicle wheels proportional to the acceleration (or deceleration) of the vehicle wheels. The combination of the flywheel (or flywheels) and the brake-type power absorber alone is referred to herein as a "passive" or "non-motoring" power absorption unit.

Electric motors have the capability of supplying as well as absorbing power and, for this reasons have been used to simulate both vehicle inertia and road load forces. Such a motor-type power absorbers supplier is referred to herein as an "active" power absorption unit. One or more flywheels may also be used in conjunction with such motors to minimize the size of the motor reguired.

When a vehicle is driven onto the dynamometer, the vehicle wheels are settled down between the rolls. When a test is completed it can be difficult to drive the vehicle back off the dynamometer rolls, since the wheels do not have sufficient traction to climb the curvature of the rolls, making it difficult to get the wheels back off the dynamometer. To alleviate this problem, dynamometers have been provided with lifts, which may be situated between the rolls of a roll pair and can be raised to engage the vehicle wheels and lift them off the rolls Such lifts are typically provided with an associated brake which brakes the rolls simultaneously with lifting the vehicle, so that the rolls cannot rotate. This makes it easy to then drive the vehicle off the dynamometer.

Dynamometers have to be periodically tested and calibrated to make sure that they operate properly. One of the calibration techniques commonly utilized is referred to as a "coast down test." For this test, the rolls are accelerated to a predetermined speed, and then the accelerating force is removed and the rolls are allowed to "coast down" from a first speed to a lower second speed while measuring the time required for this coast down. This is a simple matter for dynamometers with active power absorption units, since the motor can simply be used to accelerate the rolls and is then switched to a power absorbing mode during the coast down. However, in dynamometers with only passive power absorption units, there is no mechanism for accelerating the rolls to the predetermined speed.

In the past, calibration of such dynamometers has been attempted by driving the vehicle onto the dynamometer rolls, using the vehicle engine and wheels to accelerate the rolls to the desired speed, then using a floor jack to lift the vehicle and its wheels out of engagement with the rolls while the vehicle wheels are still spinning. (The lift which is part of the dynamometer cannot be used for this purpose, since it would make contact with the spinning vehicle wheels.) While this technique works, the procedure is considered to be quite dangerous Furthermore, this technique requires the use of at least two operators, one inside the vehicle to accelerate the engine and another to operate the floor jack.

Alternatively, it might be possible to utilize a separate electric motor along with the dynamometer to accelerate the rolls to speed, but the typical service station in which dynamometers are used do not have the requisite type of electric power available Thus, typically they do not have available three-phase power or 220-volt power. Thus, only a small motor, such as an 2-horsepower motor may be used. But such a small motor requires a long period of time (e.g., five or six minutes) to accelerate the rolls to the requisite speed and, even then, is only capable of accelerating them to between 30 and 35 mph. Furthermore, the motor must be stored somewhere and it adds an additional expense, because it must be utilized with a particular type of drive, such as a frequency inverter or flux vector inverter, which is fairly expensive.

SUMMARY OF THE INVENTION

It is a general object of the invention to provide an improved dynamometer which avoids the disadvantages of prior dynamometers while affording additional structural and operating advantages.

An important feature of the invention is the provision of a dynamometer of the type which has a passive power absorption unit which can be safely calibrated.

In connection with the foregoing feature, another feature of the invention is the provision of a dynamometer of the type set forth, in which calibration procedures can be performed by using the associated vehicle for accelerating the rolls.

Still another feature of the invention is the provision of a dynamometer of the type set forth which does not require any auxiliary power source or auxiliary lifting device for calibration.

In connection with the foregoing features, a still further feature of the invention is the provision of a dynamometer of the type set forth which permits the vehicle to be easily driven off the dynamometer.

Yet another feature of the invention is the provision of a calibration technique utilizing a dynamometer of the type set forth.

Certain ones of these and other features of the invention are attained by providing a dynamometer for simulating the inertia and road load for a motor vehicle having at least one driven wheel rotatable about a first axis, the dynamometer comprising a roll assembly including at least one roll supported for rotation about a second axis substantially parallel to the first axis, a non-braking lift mechanism disposed for engagement with the vehicle to move it, without braking the roll, between a raised position wherein the at least one wheel is out of engagement with the roll and a lowered position wherein the at least one wheel is engaged with the roll, a passive non-motoring power absorption unit for simulating road load and inertia forces to which the vehicle would be subjected during normal operation, a clutch disposed between the roll and the power absorption unit and operable between an engaged condition for coupling the power absorption unit to the roll and a disengaged condition for decoupling the power absorption unit from the roll, and a processor-based control system coupled to the roll and to the lift mechanism and to the power absorption unit for automatically controlling the operations of each under stored program control.

Still other features of the invention are attained by providing a dynamometer for simulating the inertia and road load for a motor vehicle having at least one driven wheel rotatable about a first axis, the dynamometer comprising: a roll assembly including at least one roll supported for rotation about a second axis substantially parallel to the first axis, a frame including a first edge overlying at least a portion of the roll and a ramp engageable with the vehicle wheel to facilitate driving the vehicle onto and off of the roll assembly, a lift mechanism including a wheel support having a second edge, the lift mechanism being disposed for engagement with the vehicle wheel to move it between a raised position out of engagement with the roll and a lowered position in engagement with the roll, the frame and the lift mechanism being disposed so that when the lift is in its raised position the distance between the first and second edges is such that the vehicle can be driven off the dynamometer from the second edge to the first edge substantially without the vehicle wheel contacting the roll.

Still other features of the invention are attained by providing a method of calibrating a dynamometer which includes a vehicle wheel-engaging rolls a power absorption unit having a flywheel and a brake therefor and adapted to be coupled to the roll, a lift mechanism for disengaging the vehicle wheel from the roll and a control system coupled to the lift mechanism and to the roll and to the power absorption unit, the method comprising the steps of: accelerating the roll to a predetermined rotational speed while it is coupled to the power absorption unite then decoupling the roll from the power absorption unit, then lifting the vehicle wheel out of engagement with the roll, then reengaging the roll with the power absorption unit to rotate the roll at the rotation speed of the power absorption unit, then performing a coast-down test.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
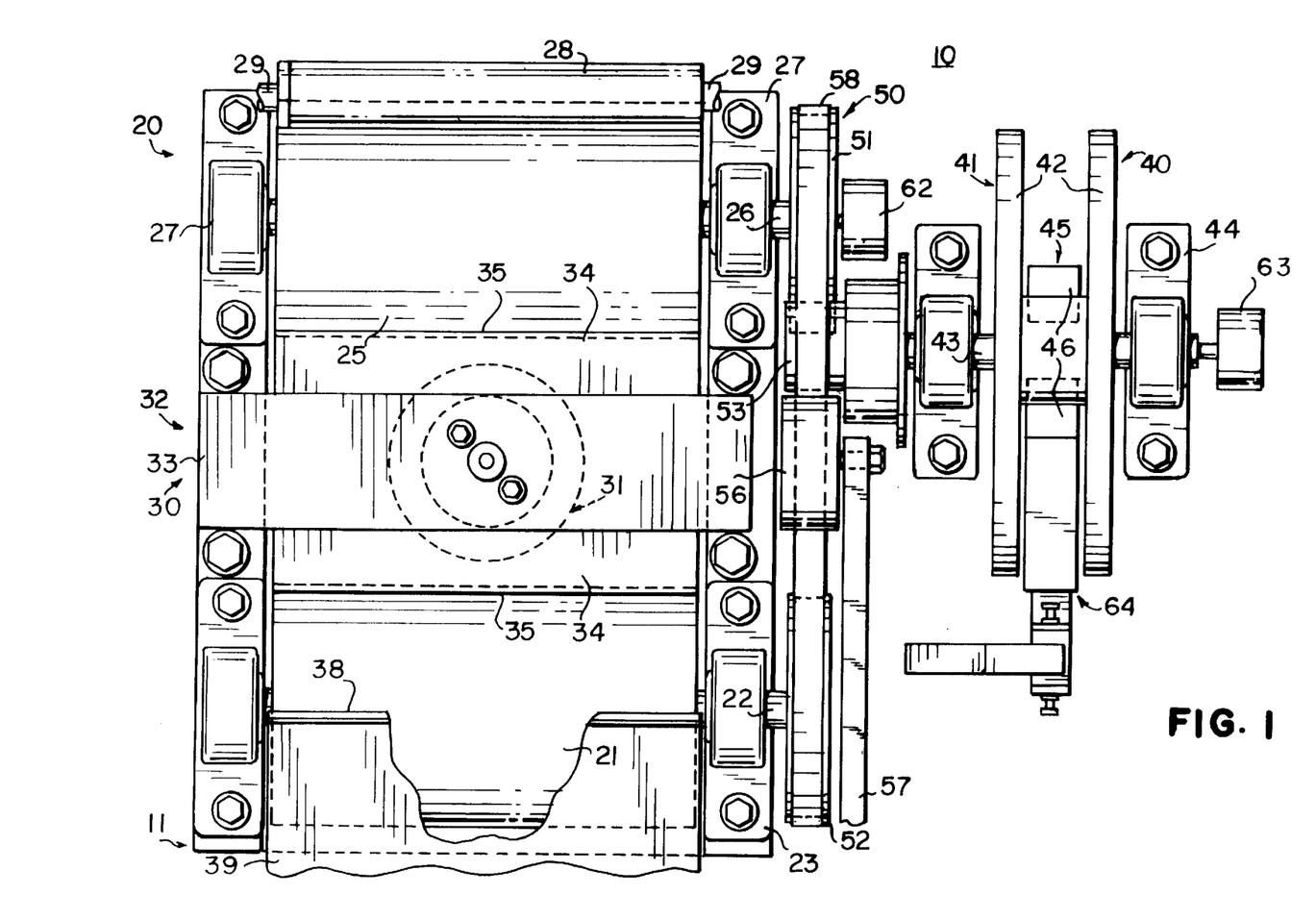
FIG. 1 is a top plan view of a dynamometer constructed in accordance with and embodying the features of the present invention, with portions broken away more clearly to illustrate the construction.
Figure 2:
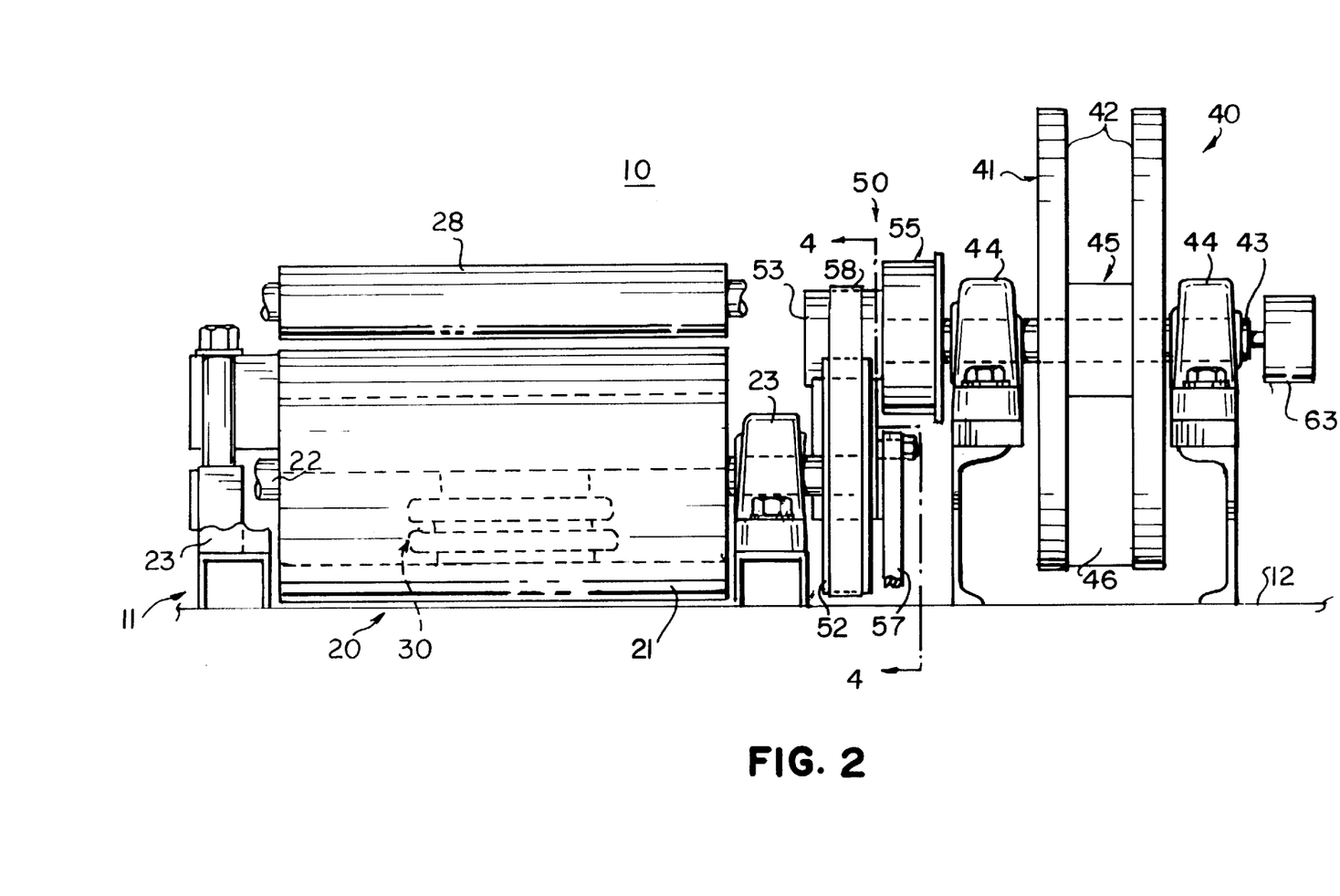
FIG. 2 is a front elevational view of the dynamometer of FIG. 1, with the entry ramp removed and portions of the associated frame broken away.
Figure 3:
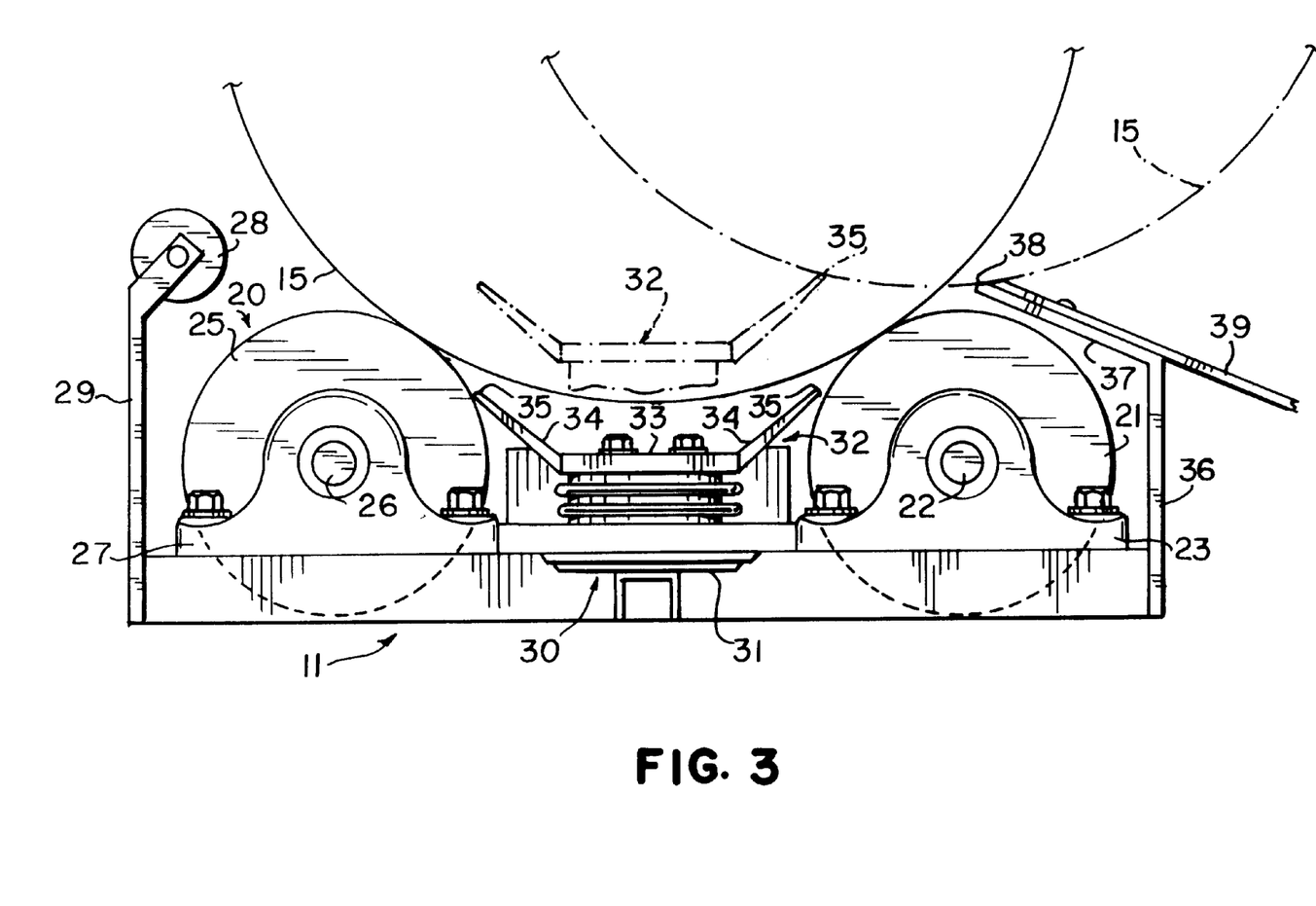
FIG. 3 is a side elevational view of the left-hand side of the dynamometer of FIG. 1.

Referring to FIGS. 1–3, there is illustrated an dynamometer generally designated by the numeral 10, constructed in accordance with and embodying the features of the present invention. The dynamometer 10 includes a roll assembly 20 for rotatably supporting an associated vehicle wheel 15 (FIG. 3) in a known manner, and also includes a lift mechanism 30 to facilitate driving the vehicle onto and off of the dynamometer 10, also in a known manner. The dynamometer 10 has a frame 11 which is mounted on an underlying floor 12 or other support surface, and is of the type which utilizes a passive power absorption unit 40, i.e., it does not include an electric motor or other power source for accelerating the roll assembly 20.

The dynamometer 10 illustrated in the drawings is of the type which utilizes two separate roll assemblies for respectively supporting two driving wheels of a vehicle, such as an automobile, mounted on a common axis. A dynamometer of this type is disclosed, for example, in my copending U.S. application Ser. No. 613,449, filed Mar. 1, 1996, now U.S. Pat. No. 5,844,145. Only one of the roll assemblies is illustrated in the drawings, it being appreciated that the other will be substantially a mirror image of the one illustrated. In this type of dynamometer each roll assembly 20 has a relatively narrow width to accommodate only a single vehicle wheel 15. However, it will be appreciated that the principles of the present invention apply equally well to dynamometers of the type which utilize a single, wide roll assembly having a width sufficient to accommodate both driving wheels of the associated vehicle.

The roll assembly 20 includes a first or access roll 21 with a shaft 22 having the ends thereof respectively journalled in bearings carried by pillow blocks 23, and a second roll 25 with a shaft 26 journalled in bearings supported by pillow blocks 27, the pillow blocks 23 and 27 being mounted suitably on the associated frame 11. The roll assembly 20 also includes a retaining roll 28 mounted between supports 29 carried by the frame 11, so as to be disposed a predetermined distance above the roll 25 to provide a stop to inhibit the vehicle wheel 15 from rolling off the end of the roll assembly 20, in a known manner. It will be appreciated that the roll shafts 22 and 26 are parallel and spaced apart a distance such that they cooperate to support the associated vehicle wheel 15 therebetween in a well-known manner, as is best illustrated in FIG. 3.

The lift mechanism 30 is of substantially standard construction and is disposed between the rolls 21 and 25, in a known manner. The lift mechanism 30 has a power unit 31 for raising and lowering a generally channel-shaped wheel support 32, which has a flat, substantially horizontal, rectangular bass 33 unitary at its forward and rearward ends with upwardly and outwardly inclined flanges 34, respectively terminating in distal end edges 35. The wheel support 32 is dimensioned and arranged so that the distance between the distal end edges 35 is greater than the distance between the rolls 21 and 25 so that the flanges 34 respectively overlie at least portions of the rolls 21 and 25, as can best be seen in FIG. 3. The lift mechanism 30 operates in a known manner for vertical movement between a lowered position, illustrated in solid line in FIG. 3, and a raised position, illustrated in broken line in FIG. 3. In standard manner, the lift mechanism 30 is arranged so that, in its lowered position, the wheel support 32 is out of contact with the rolls 21 and 25 and the associated vehicle wheel 15 supported thereon in its raised position, the distal end edges 35 of the wheel support 32 are disposed above the rolls 21 and 25 for lifting the vehicle wheel 15 off the rolls. However, unlike traditional dynamometer lift mechanisms, the lift mechanism 30 does not have a roll brake, so that the rolls 21 and 25 are not braked or decelerated in response to movement of the lift mechanism 30 to its raised position.

The frame 11 is provided with an upstanding wall 36 adjacent to the access roll 21, provided at its upper end with an upwardly inclined flange 37 which terminates at a distal end edge 38. overlying the flange 37 and fixedly secured thereto parallel thereto is an inclined ramp 39, Which projects outwardly beyond the frame wall 36 to the associated floor 12 to facilitate driving the vehicle wheel 15 onto the dynamometer 10, in a known manner It is a significant aspect of the invention that the inclined flange 37 overlies approximately half of the access roll 21, so that the distal end edge 38 is disposed above the roll 21 close to the vertical diametral plane thereof, as can best be seen in FIG. 3. The lift mechanism 30 is arranged so that, in its raised position, the distal end edges 35 of the wheel support 32 are substantially at the same vertical level as the distal end edge 38 of the inclined flange 37 and so that the gap between the distal and edge 38 and the adjacent one of the lift mechanism end edges 35 is such that the associated vehicle wheel 15 can be driven off the lift mechanism 30 onto the ramp 39 substantially without contacting the access roll 21, as is illustrated in FIG. 3. Thus, in accordance with this aspect of the invention, the vehicle wheel 15 can easily be driven off the dynamometer 10 even though the access roll 21 is not braked. Even if the vehicle wheel 15 were to touch the roll 21 (e.g., as a result of underinflation of the vehicle tire), the vehicle wheel 15 will still make adequate frictional contact with the distal end edge 38 so that it can be easily driven onto the ramp 39.

While the dynamometer 10 has been described herein as being elevated above the floor 12, it will be appreciated that the principles of the present invention also apply to dynamometers located in pits below floor level, in which case the ramp 39 need not be inclined.

The passive power absorption unit 40 includes a flywheel assembly 41 including a pair of circular disks 42 joined at an associated hub mounted for rotation about a shaft 43, the ends of which are respectively journalled in bearings carried by pillow blocks 44 on an associated frame, in a known manner. The power absorption unit 40 also includes an eddy current brake, generally designated by the numeral 45, which includes a pair of electromagnetic coils 46 (FIG. 1) which cooperate with the flywheel 41 in a known manner to simulate road load.

Figure 4:
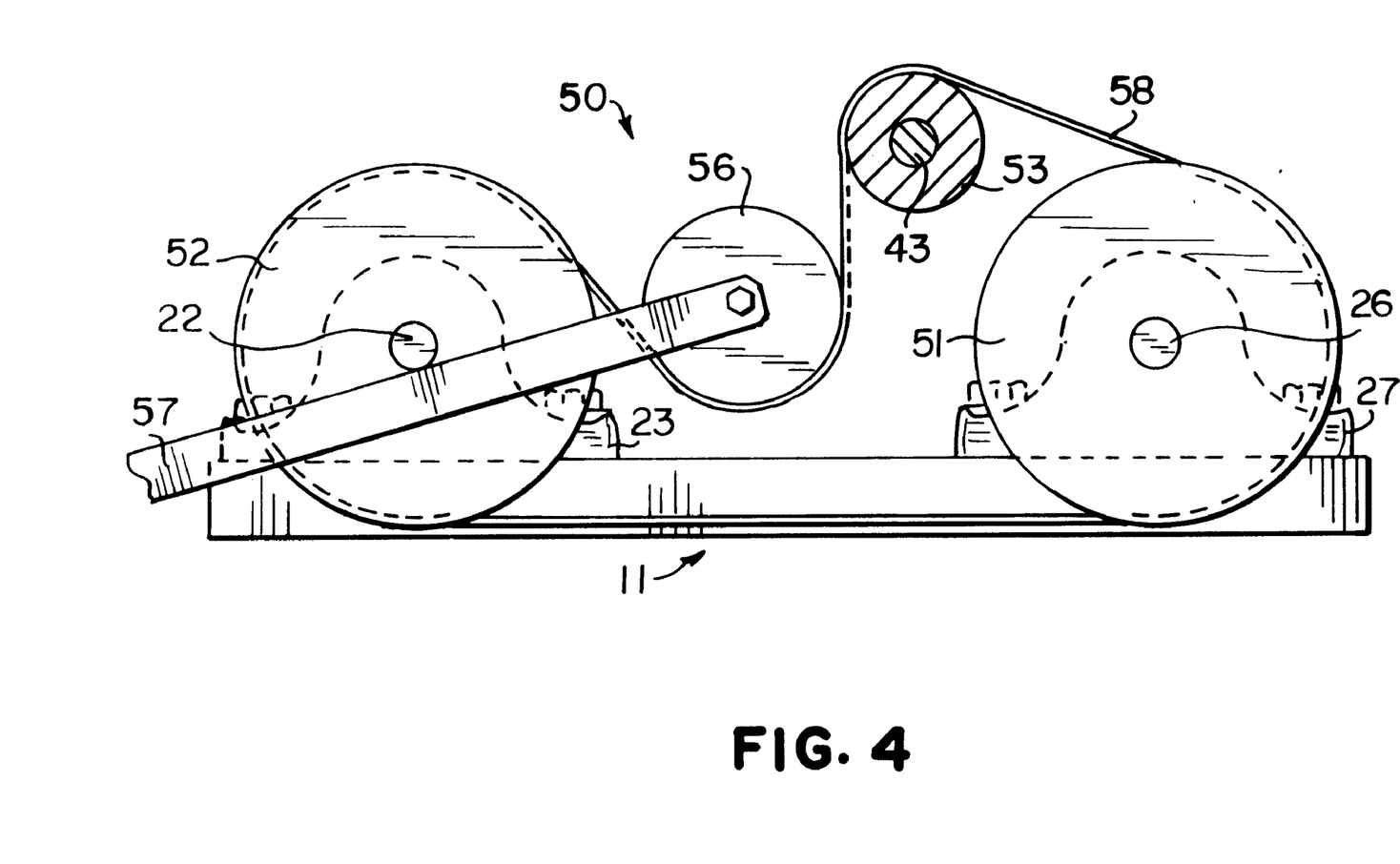
FIG. 4 is a fragmentary view in vertical section taken generally along the line 4—4 in FIG. 2.

Referring now also to FIG. 4, the power absorption unit 40 is coupled to the roll assembly 20 through a coupling assembly 50, which includes pulleys 51 and 52, respectively mounted on the shafts 26 and 22 of the rolls 25 and 21. The coupling assembly 50 also includes a pulley 53 of a clutch mechanism 55 (FIG. 3), the clutch mechanism 55 also including a portion fixed to the shaft 43 of the power absorption unit 40. There is also provided a pulley 56 of a tensioner arm 57 adjustably pivotally mounted on the frame 11 in a suitable fashion. A drive belt 58 engages the pulleys 51–53 and 56 in the manner illustrated in FIG. 4, so that the rolls 21 and 25 are rotated in unison. The clutch mechanism 55 may be of any of a number of different types, and it is a significant aspect of the invention that it is operated between an engaged condition coupling the power absorption unit 40 to the roll assembly 20, and a disengaged condition decoupling the power absorption unit 40 from the roll assembly 20. While the coupling assembly 50 has been illustrated using a drive belt, it will be appreciated that the same results could also be achieved by a suitable gear train.

Figure 5:
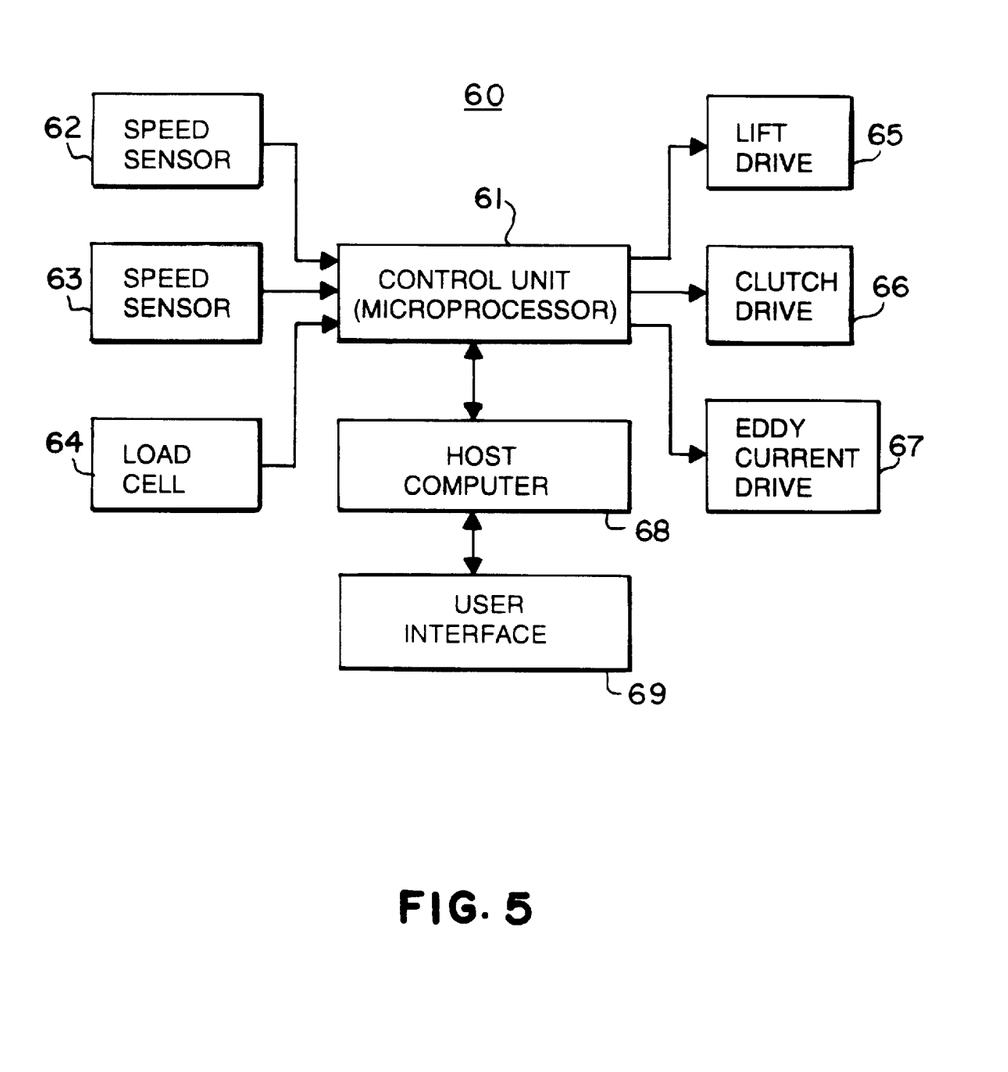
FIG. 5 is a functional block diagrammatic view of the control system for the dynamometer of FIG. 1.

Referring to FIG. 5, there is illustrated a control system 60 for controlling the operation of the dynamometer 10. The control system 60 includes a control unit 61, which is preferably microprocessor-based and operates under stored program control. The control system 60 also includes speed sensors 62 and 63, preferably in the nature of speed encoders, respectively coupled to the shaft 26 of the roll assembly 20 and the shaft 43 of the power absorption unit 40, for providing to the control unit 61 electrical signals representative of the rotational speeds of those shafts, in a known manner. Similarly, the control system 60 includes a load cell 64 for sensing the torque applied by the power absorption unit 40 in a known manner and providing to the control unit 61 an electrical signal representative of that torque. The control unit 61 also provides output signals to a lift drive unit 65, a clutch drive unit 66 and an eddy current drive unit 67 for, respectively, controlling the operations of the lift mechanism 30, the clutch mechanism 55 and the eddy current brake 45. It will be appreciated that the control unit 61 also includes suitable circuitry for synchronizing the operation of the two roll assemblies 20 when the dynamometer 10 is of the type, as illustrated herein, utilizing dual roll assemblies 20 for the two vehicle driving wheels. Such synchronizing circuitry may be of the type disclosed in my aforementioned copending U.S. application Ser. No. 613, 449. The control unit 61 could be provided with its own user interface. If not, the control unit 61 is coupled by a suitable port to a host computer 68 provided with a user interface 69, which may include a display screen and a suitable input device, to permit user communication with the control unit 61.

Figure 6:
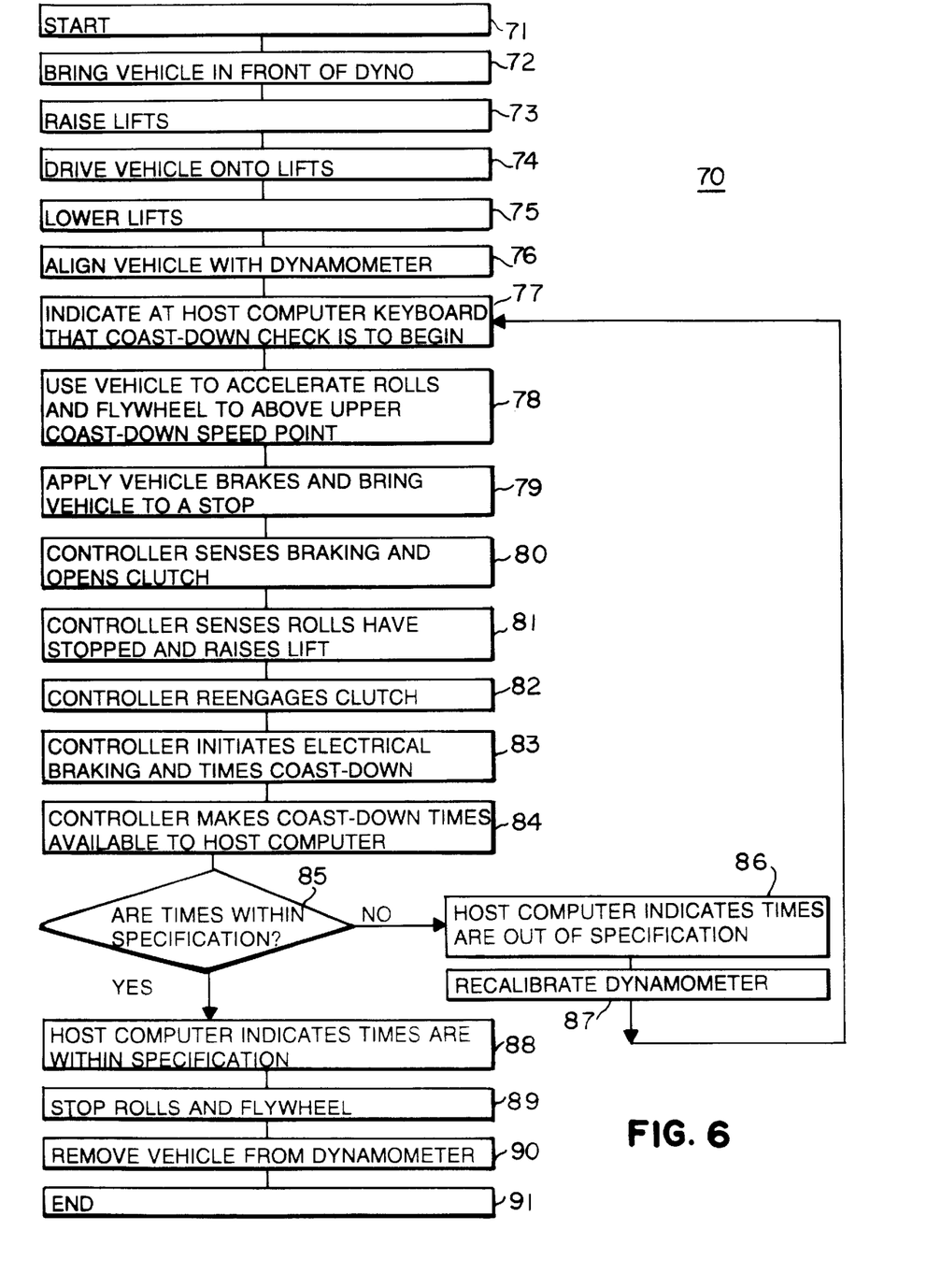
FIG. 6 is a flow chart diagram of the operation of the control system of FIG. 5 during a coast-down calibration procedure.
Figure 7:
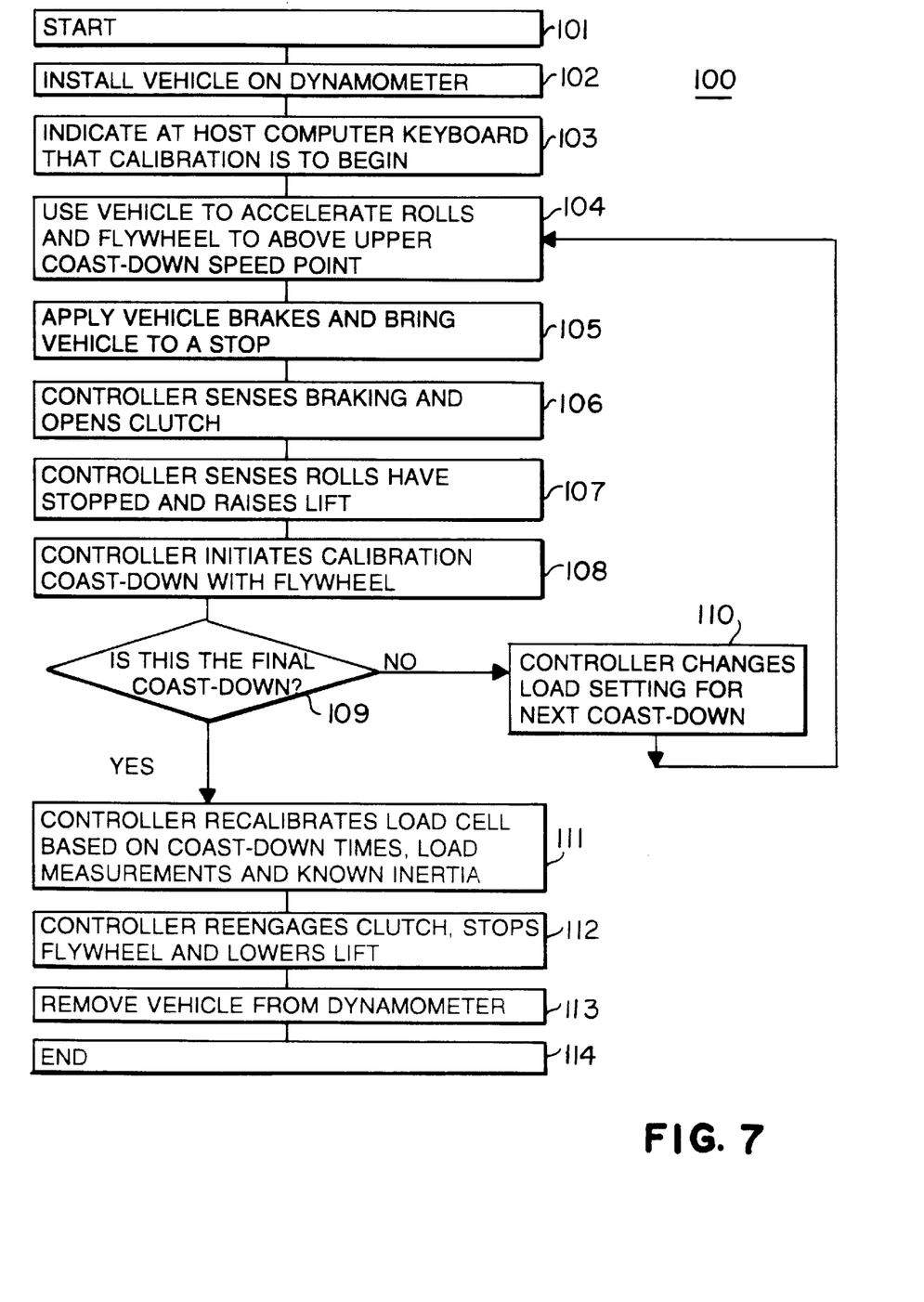
FIG. 7 is a flow chart diagram of operation of the control system of FIG. 5 during a load cell calibration procedure.

Referring now also to FIGS. 6 and 7, the detailed operation of the dynamometer 10, particularly with respect to the performance of certain calibration techniques therefor which require acceleration of the roll assembly 20, will be explained. In this regard, it is a fundamental aspect of the invention that the presence of the clutch mechanism 55 and the absence of a roll brake coupled to the lift mechanism 30 permits the use of the associated vehicle to accelerate the roll assembly 20 and to then be lifted off the roll assembly 20 in a completely safe manner which does not interfere with the performance of the rest of the calibration procedures and without the use of auxiliary equipment, all by a single operator.

Coast Down Test

FIG. 6 is a flow diagram 70 for this procedure. Initially, when the procedure starts at 71, the dynamometer 10 is in the condition illustrated in solid line in FIGS. 1–3, with the lift mechanism 30 in its lowered position. The clutch mechanism 55 is in its normal engaged condition coupling the roll assembly 20 to the power absorption unit 40. The vehicle is driven in front of the dynamometer 10 at 72 and the lift mechanism 30 is raised at 73. Then the vehicle is driven via the ramp 39 onto the wheel support 32 of the lift mechanism 30, at 74. Then, at 75, the operator lowers the lift mechanism 30 and aligns the vehicle with the dynamometer at 76. Then, at 77, the operator indicates to the control unit 61, by means of the host computer 68 and its user interface 69, that he is initiating a coast-down check.

Next, the operator enters the vehicle and operates the vehicle engine to use the wheel 15 to bring the roll assembly 20 up to a predetermined speed, at 78. Then, at 79, the operator applies the vehicle brakes to stop the vehicle wheels and, thereby, the roll assembly 20. As soon as the vehicle brake is applied, the control unit 61, at 80, immediately senses the deceleration and actuates the clutch mechanism 55 to its disengaged condition before the roll assembly 20 can be decelerated substantially from the predetermined speed Thus, the flywheel 41 continues to spin, as described above. More specifically, the control unit 61 can determine the force FV applied by the vehicle to the roll assembly 20 by means of an algorithm disclosed, for example, in my U.S. Pat. No. 4,327,578. As soon as the force F becomes negative, indicating that the vehicle is being decelerated, this will be sensed almost instantaneously by the control unit 61, which will open the clutch mechanism.

The control unit 61 will then, at 81, sense when the roll assembly 20 has stopped, and operate the lift mechanism 30 to its raised condition to lift the vehicle off the roll assembly 20. Then, at 82, the control unit 61 reengages the clutch mechanism 55. Thus, the spinning flywheel 41 will reaccelerate the roll assembly 20 to the flywheel speed, since there is no roll brake associated with the lift mechanism 30.

The coast down test is then automatically performed at 83 by use of the eddy current brake. The control unit 61 then, at 84, makes the coast-down times available to the host computer 67 which, at 85, decides whether or not those times are within specification. If they are not, the host computer indicates this fact to the operator at 86 and, at 87 proceeds to recalibrate the dynamometer 10, returning to block 77. If the times are within spec, the control unit 61 at 88, indicates this fact to the operators Then, at 89, the control unit 61 stops the flywheel 41 and the roll assembly 20, as by use of the eddy current brake. Then, at 90, the operator removes the vehicle from the dynamometer and the procedure ends at 91.

Load Cell Calibration

Another calibration test which can be performed, and which also requires acceleration of the roll assembly 20, is a load cell calibration illustrated in the flow diagram 100 of FIG. 7. During this procedure flywheel coast-down is performed at different load settings. Each coast-down gives a point on a calibration curve, and the number of coast-downs required depends on the degree of non-linearity of the calibration curve. After the start of the procedure at 101, the vehicle is installed on the dynamometer 10 at 102, by following steps 72–76 described above in connection with FIG. 6. Then at 103, the user indicates via the user interface 69 that a load cell calibration test is to begin. Then the operator accelerates the vehicle on the rolls to a predetermined speed at 104. At 105 the operator brakes the vehicle to stop the roll assembly 20. Again, as soon as braking is initiated, the deceleration is sensed and the control unit 61 actuates the clutch mechanism 55 to its disengaged condition at 106, whereupon the roll assembly 20 continues to decelerate and stop but the flywheel 41 continues to spin. The control unit 61 senses that the rolls have stopped and raises the lift at 107 and then, at 108, initiates the first calibration coast-down of the flywheel, using the eddy current brake Then, at 109, the control unit 61 checks to see if the coast-down procedure just completed was the final coast down. If this is not the final coast down, the program changes the load setting at 110 and returns to block 104 to perform another coast-down procedure. If, at 109, it is the final coast down, the control unit 61 next, at 111, recalibrates the load cell 64 based on the coast-down times load measurements and known inertia. Then, at 112, the control unit 61 reengages the clutch mechanism 55, stops the flywheel 41 and lowers the lift mechanism 30, after which the vehicle is removed from the dynamometer 10 at 113, and the procedure ends at 114.

From the foregoing, it can be seen that there has been provided an improved dynamometer of the type utilizing a power absorption unit and a calibration technique therefor, which permit a single operator to accelerate the dynamometer rolls by the use of the vehicle, and then to safely lift the vehicle using the dynamometer lift mechanism and perform the calibration tests all without the use of any auxiliary equipment.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the inventions The matter set forth in the foregoing description and accompanying drawings is offered by way of illustration only and not as a limitation The actual scope of the invention is intended to be defined in the following claims when viewed in their proper perspective based on the prior art.

I claim:

1. A dynamometer for simulating the inertia and road load for a motor vehicle having at least one driven wheel rotatable about a first axis, said dynamometer comprising:

a roll assembly including at least one roll supported for rotation about a second axis substantially parallel to the first axis, a non-braking lift mechanism disposed for engagement with the vehicle to move it, without braking the at least one roll, between a raised position wherein the at least one wheel is out of engagement with the at least one roll and a lowered position wherein the at least one wheel is engaged with the at least one roll, a passive non-motoring power absorption unit for simulating road load and inertia forces to which the vehicle would be subjected during normal operation, a clutch disposed between said roll assembly and said power absorption unit and operable between an engaged condition for coupling the power absorption unit to the roll assembly and a disengaged condition for decoupling the power absorption unit from the roll assembly, and a processor-based control system coupled to said roll assembly and to said lift mechanism and to said power absorption unit for automatically controlling the operations of each under stored program control.

2. The dynamometer of claim 1 wherein said power absorption unit includes a flywheel and a brake therefor.

3. The dynamometer of claim 2, wherein said brake is an eddy current brake.

4. The dynamometer of claim 1, wherein said control system includes sensors coupled to said processor and to said at least one roll and to said power absorption unit for sensing the speeds of said at least one roll and said power absorption unit and the torque applied by said power absorption unit.

5. The dynamometer of claim 1, wherein said roll assembly includes two rolls disposed for rotation about parallel axes for cooperation to simultaneously engage the vehicle wheel.

6. The dynamometer of claim 5, wherein said lift mechanism is disposed between said rolls.

7. A dynamometer for simulating the inertia and road load for a motor vehicle having at least one driven wheel rotatable about a first axis, said dynamometer comprising:

a roll assembly including at least one roll supported for rotation about a second axis substantially parallel to the first axis, a frame including a first edge overlying at least a portion of the roll and a ramp engageable with the vehicle wheel to facilitate driving the vehicle onto and off of the roll assembly, a lift mechanism including a wheel support having a second edge, said lift mechanism being disposed for engagement with the vehicle wheel to move it between a raised position out of engagement with the roll and a lowered position in engagement with the roll, said frame and said lift mechanism being disposed so that when said lift mechanism is in its raised position the distance between said first and second edges is such that the vehicle can be driven off the dynamometer from the second edge to the first edge substantially without the vehicle wheel contacting the roll.

8. The dynamometer of claim 7, wherein said frame overlies substantially half of the roll.

9. The dynamometer of claim 7, wherein said second edge of said lift mechanism overlies at least a portion of the roll.

10. The dynamometer of claim 7, wherein when said lift mechanism is in its raised position said first and second edges are disposed at substantially the same vertical level.

11. The dynamometer of claim 7, wherein said roll assembly includes two rolls disposed for rotation about parallel axes for cooperation to simultaneously engage the vehicle wheel.

12. The dynamometer of claim 11, wherein said lift mechanism is disposed between said rolls.

13. A method of calibrating a dynamometer which includes a vehicle wheel-engaging roll, a power absorption unit having a flywheel and a brake therefor and adapted to be coupled to the roll, a lift mechanism for disengaging the vehicle wheel from the roll and a control system coupled to the lift mechanism and to the roll and to the power absorption unit, the method comprising the steps of:

accelerating the roll to a predetermined rotational speed while it is coupled to the power absorption unit, then decoupling the roll from the power absorption unit, then lifting the vehicle wheel out of engagement with the roll, then reengaging the roll with the power absorption unit to rotate the roll at the rotation speed of the power absorption unit, then performing a coast-down test.

14. The method of claim 13, wherein the accelerating step is performed by accelerating the vehicle wheel while the wheel is engaged with the roll.

15. The method of claim 14, wherein the roll is stopped before vehicle is lifted.

16. The method of claim 15, wherein the roll is stopped by braking vehicle wheel.

17. The method of claim 13, and further comprising the step of stopping the roll and the power absorption unit after performance of the coast-down test.

18. The method of claim 17, and further comprising the step of lowering the vehicle wheel back into engagement with the roll after the roll and the power absorption unit are stopped.

19. A dynamometer for simulating the inertia and road load for a motor vehicle having at least one driven wheel rotatable about a first axis, said dynamometer comprising:

a roll assembly including at least one roll supported for rotation about a second axis substantially parallel to the first axis, a frame including a first edge overlying at least a portion of the at least one roll and a ramp engageable with the at least one wheel to facilitate driving the vehicle onto and off of the roll assembly, a non-braking lift mechanism including a wheel support having a second edge and disposed for engagement with the at least one wheel to move it between a raised position out of engagement with the at least one roll and a lowered position in engagement with the at least one roll, said frame and said lift mechanism being disposed so that when said lift mechanism is in its raised position the distance between said first and second edges is such that the at least one wheel can be driven off the dynamometer from the second edge to the first edge substantially without the at least one wheel contacting the at least one roll, a passive non-motoring power absorption unit for simulating road load and inertia forces to which the vehicle would be subjected during normal operation, a clutch disposed between said roll assembly and said power absorption unit and operable between an engaged condition for coupling the power absorption unit to the roll assembly and a disengaged condition for decoupling the power absorption unit from the roll assembly, and a processor-based control system coupled to said roll assembly and to said lift mechanism and to said power absorption unit for automatically controlling the operations of each under stored program control.

* * * * *